United States Patent Office 3,558,537
Patented Jan. 26, 1971

3,558,537
IMPARTING ANTIFOGGING PROPERTIES TO POLYVINYL CHLORIDE RESINS AND COMPOSITIONS THEREFOR
Arthur C. Hecker, Forest Hills, and Stuart Donald Brilliant, Brooklyn, N.Y., assignors to Argus Chemical Corporation, Brooklyn, N.Y., a corporation of Delaware
No Drawing. Filed Jan. 2, 1968, Ser. No. 694,802
Int. Cl. C08f 29/18, 45/62
U.S. Cl. 260—23          16 Claims

ABSTRACT OF THE DISCLOSURE

A polyvinyl chloride resin antifogging composition is provided capable of improving the resistance of the resin to fogging, comprising a partial ester of polyglycerol with an unsaturated monocarboxylic aliphatic acid having from about eight to about twenty-four carbon atoms. The polyglycerol partial ester retains at least 25% of its free hydroxyl groups. Othere additives can be incorporated as well, such as a polyvinyl chloride resin epoxy plasticizer, and other heat stabilizers to improve resistance of the resin to heat deterioration. Polyvinyl chloride resin compositions are also provided, comprising such polyglycerol partial ester antifogging agents.

---

This invention relates to a process for imparting antifogging properties to polyvinyl chloride resins, to compositions which, when incorporated in polyvinyl chloride resins, impart antifogging properties thereto, and to polyvinyl chloride resin compositions resistant to fogging comprising such compositions.

The dropwise condensation of moisture, commonly referred to as fogging or misting, is frequently encountered with hydrophobic transparent plastic wrapping materials. The occurrence of this condition, arising from the condensation of moisture present within the package, obscures visibility of the contents through the wrapper, and detracts considerably from the attractiveness of the merchandise. The problem is particularly acute when products such as foodstuffs having a high moisture content are packaged within transparent plastic films.

Transparent polyolefin resin films such as polyethylene are now widely used for this purpose. Accordingly, a number of compositions have been proposed, with the objective of diminishing the tendency of moisture to condense in the form of droplets on the plastic film.

While it is generally known that surface-active materials have the property of reducing the tendency of polyolefins to fog, antifogging compositions satisfactory with polyolefins are not satisfactory for use with polyvinyl chloride resins. The difficulty may partly arise from the complex stabilizer systems that are required with polyvinyl chloride resins, in order to impart the necessary heat stability to permit processing of the resin.

Polyvinyl chloride resins are notoriously unstable when heated to the temperatures required for working of the resin, due to liberation of chlorine, mostly in the form of hydrogen chloride. The stabilizer systems that are used for the purpose of improving resistance to heat deterioration include components capable of taking up the hydrogen chloride that is liberated, as well as components which prevent the development of discoloration due to oxidation, and additional components which preserve clarity or transparency. The use of three and four-component stabilizer systems for polyvinyl chloride resins is now commonplace, and such combinations are the subject of many patents, of which U.S. Pats. Nos. 2,564,646, 2,716,092 and 2,997,453 to Leistner et al. are exemplary.

The difficulty is that surfactant materials that are used with other resins, such as polyolefins, to impart antifogging properties cannot be used with polyvinyl chloride resins because they deleteriously affect heat stability, frequently quite upsetting the heat stabilizing system that is employed, and requiring a complete reformulation both of the heat stabilizer and of the antifogging components.

U.S. Pat. No. 3,048,263, patented Aug. 7, 1962, to Sacks and Underwood, describes a class of antifogging agents which can be incorporated with polyolefins, such as polyethylene and polypropylene. These are monoglycerides of a fat-forming fatty acid, or mixtures of monoglycerides and diglycerides of fat-forming fatty acids. The monoglycerides present are said to be the active ingredient, and to impart the fog-resistance to the polyolefin film. British Pat. Nos. 941,757 and 941,796, both published Nov. 13, 1963, to Union Carbide Corporation, describe the use of monoglycerides of fat-forming fatty acids, ethers and esters of ethylene oxide, sorbitan ethers and esters containing at least one ethylene oxide unit, amines or amides containing at least two ethylene oxide units, all of which contain at least one acyl group derived from a fat-forming fatty acid having from twelve to twenty-two carbon atoms. These antifogging agents cannot be used with the customary polyvinyl chloride resin heat stabilizer systems, particularly those used with resins designed for food packaging, because they upset the heat-stabilizing effectiveness of the heat stabilizer.

In accordance with the instant invention, it has been determined that partial esters of polyglycerol with unsaturated fatty acids are capable of imparting antifogging properties to polyvinyl chloride resins, and at the same time do not deteriously affect the heat-stabilizing effectiveness of the usual polyvinyl chloride resin heat stabilizers. The invention accordingly provides antifogging compositions for polyvinyl chloride resins based on the partial esters of polyglycerol wherein not more than 75% of the hydroxyl groups of the polyglycerol are esterified with unsaturated fatty acids, with and without other polyvinyl chloride resin adjuncts, including plasticizers, heat stabilizers, light stabilizers, and other modifying components of conventional type. Polyvinyl chloride resin compositions containing such antifogging agents, with or without other heat and light stabilizers and other adjuncts, display antifogging properties as well as the useful properties imparted by the adjuncts employed together therewith.

Preferably, not more than half of the hydroxyl groups in the polyglyceryl partial ester are esterified. The degree of esterification is best determined by a comparison of the hydroxyl (OH) number with the saponification number. For example, if the saponification number equals the OH number, half of the hydroxyl groups are esterified. If the OH number is twice the saponification number, a third of the hydroxyl groups are esterified. Methods for determining the saponification number and OH numbers are shown in The Official and Tentative Methods of the American Oil Chemists' Society, A.O.C.S. Methods Cd–3–25 and Cd–13–60.

The antifogging agents in accordance with the invention are in effect 2-hydroxy polyoxypropylene glycols, esterified in a proportion of at least one hydroxyl group per molecule with an unsaturated fatty acid, but not more than 75% of its hydroxyl groups. They are accordingly defined by the following general formula:

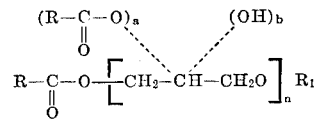

R is the residue of an unsaturated fatty acid having from about eight to about twenty-four carbon atoms.

Exemplary R radicals are lauroleyl, oleyl, ricinoleyl, linoleyl, linolenyl, myristoleyl, palmitoleyl, gadoleyl, petroselyl, erucyl, cetoleyl, nervonyl, and brassidyl.

$n$ represents the number of glyceryl units in the polyglycerol, and ranges from about two to about twelve, preferably from two to eight.

$a$ and $b$ represent respectively the number of ester groups and free hydroxyl groups in the molecule. The sum of $a+b$ is equal to $n$, and $(b+1)$ must equal at least 25% of $(n+2)$ (the total number of hydroxyl groups in the polyglycerol), and $(b+1)$ is preferably at least 50% of $(n+2)$.

$R_1$ is either (RCO)− or hydrogen.

Exemplary are the oleyl partial esters of a polyglycerol having from three to fourteen hydroxyl groups in the molecule, and from two to about twelve glyceryl units, the corresponding ricinoleyl and linoleyl partial esters, and the corresponding erucyl, palmitoleyl, and myristoleyl esters.

A mixture of R groups can be present, as where the polyglycerol is esterified with a mixture of acids. Such a mixture of acids can be obtained for example in such natural products as the vegetable oils: cottonseed oil, linseed oil, rapeseed oil, olive oil, soybean oil and tung oil. The materials of this invention also can contain a certain proportion of saturated ester groups, i.e., where R is the residue of a saturated acid such as lauric acid or stearic acid. Generally, the proportion of saturated R groups in the product of this invention should not be greater than about 40 mol percent of the total. Certain of the naturally occurring or partially hydrogenated vegetable oils, for example, may contain stearates in admixture with the unsaturated esters, such as the oleates or linoleates. These can then be reacted with the polyglycerol without removing the saturated acids.

These polyglycerol partial esters are compatible with the usual polyvinyl chloride resin adjuncts, including heat stabilizers, plasticizers, and light stabilizers. In some cases, the polyglycerol partial esters may enhance the effectiveness of the adjuncts.

For instance, it is well known that epoxy compounds also enhance the resistance of a polyvinyl chloride resin to heat deterioration, but they are not normally sufficiently effective in this respect to permit their use without additional heat stabilizers. When, however, a polyglycerol partial ester in accordance with the invention is employed, no additional heat stabilizer appears to be necessary. Thus, the polyglycerol partial ester appears to enhance the heat stabilizing effectiveness of the epoxy compound, and such compositions accordingly represent a preferred embodiment of antifogging and heat stabilizing composition in accordance with the invention.

As the epoxy compound (stabilizer and optionally plasticizer), there can be used any organic compound containing at least one epoxy group. The amount can range from 0 to 100 parts by weight per 100 parts of resin, depending upon the effect desired, inasmuch as many epoxy compounds are also plasticizers for polyvinyl chloride resins, as will be noted in the discussion which follows.

Any epoxy compound can be used. The compounds can be aliphatic or cycloaliphatic in character, but aromatic, heterocyclic and alicyclic groups can also be present. The epoxy compounds have from about 10 to about 150 carbon atoms. Some longer chain aliphatic compounds are also plasticizers. Typical epoxy compounds that have little or no plasticizing action are epoxy carboxylic acids such as epoxy stearic acid, epoxy erucic acid, glycidyl ethers of polyhydric alcohols and phenols, such as triglycidyl glycerine, diglycidyl ether of diethylene glycol, glycidyl epoxy stearyl ether, 1,4-bis(2,3-epoxy propoxy)benzene, 4,4'-bis(2,3-epoxy propoxy)diphenyl ether, 1,8-bis(2,3-epoxy propoxy)octane, 1,4-bis(2,3-epoxy propoxy)cyclohexane, and 1,3-bis(4,5-epoxy pentoxy)-5-chlorobenzene, the epoxy polyethers of polyhydric phenols, obtained by reacting a polyhydric phenol with a halogen-containing epoxide or dihalohydrin, such as the reaction products of resorcinol, catechol, hydroquinone, methyl resorcinol or polynuclear phenols such as 2,2-bis(4-hydroxyphenyl) propane (Bisphenol A), 2,2-bis(4-hydroxyphenyl)butane, 4,4'-dihydroxybenzophenone and 1,5-dihydroxy naphthalene with halogen-containing epoxides such as 3-chloro-1,2-epoxy butane, 3-chloro-1,2-epoxy octane, and epichlorhydrin. Typical epoxy compounds that combine stabilizing with plasticizing action are listed below under plasticizers.

Additional heat stabilizers which are well known and which can be employed with the polyglycerol partial esters of the invention include the polyvalent metal salts of organic monocarboxylic acids, alkali metal salts of such acids, and mixtures thereof.

The alkali metal salts employed are lithium, sodium, potassium, rubidium and cesium salts of organic carboxylic acids having from two to about thirty carbon atoms. Mixed acids and mixed alkali metal salts can be used.

Aliphatic, aromatic, cycloaliphatic and oxygen-containing heterocyclic mono- and polycarboxylic acids are operative, as a class. The acids may be substituted, if desired, with groups such as halogen, sulfur, and hydroxyl. The oxygen-containing heterocyclic acids include oxygen and carbon in the ring structure, of which alkyl-substituted furoic acids are exemplary. As exemplary of the acids there can be mentioned the following: caproic acid, capric acid, 2-ethyl hexoic acid, enanthic acid, caprylic acid, pelargonic acid, hendecanoic acid, lauric acid, tridecanoic acid, pentadecanoic acid, margaric acid, arachidic acid, heneicosanoic acid, behenic acid, tricosanoic acid, tetracosanoic acid, pentacosanoic acid, cerotic acid, heptacosanoic acid, octacosanoic acid, nonacosanoic acid, and triacontanoic acid, suberic acid, azelaic acid, sebacic acid, brassylic acid, thapsic acid, 2-propyl-1,2,4-pentanetricarboxylic acid, chlorocaproic acid, hydroxy capric acid, stearic acid, hydroxy stearic acid, palmitic acid, oleic acid, linoleic acid, myristic acid, oxalic acid, adipic acid, succinic acid, tartaric acid, α-naphthoic acid, dodecyl thioether propionic acid $C_{12}H_{25}$—S—$(CH_2)_2$—COOH, hexahydrobenzoic acid, benzoic acid, phthalic acid, phenylacetic acid, terephthalic acid, glutaric acid, monomethyl succinate, isobutyl benzoic acid, monethyl ester of phthalic acid, ethyl benzoic acid, isopropyl benzoic acid, ricinoleic acid, maleic acid, fumaric acid, monoethyl maleate, p-t-butylbenzoic acid, n-hexyl benzoic acid, salicylic acid, β-naphthoic acid, β-naphthalene acetic acid, orthobenzoyl benzoic acid, naphthenic acids derived from petroleum, abietic acid, dihydroabietic acid, and methyl furoic acid.

The mixed fatty acids derived from edible fats and oils such as the mixed fatty acids derived from tallow, coconut oil, cottonseed oil, soybean oil, corn oil and peanut oil are particularly useful in connection with nontoxic stabilizing combinations. In such instances, the oils from which the fatty acids are derived may be hydrogenated. Also useful are the distilled fractionated fatty acid mixtures derived from such oils.

The preferred alkali metal salts are the sodium, potassium and lithium salts of monocarboxylic aliphatic fatty acids having from eight to eighteen carbon atoms.

The polyvalent metal salt is a salt of any monocarboxylic organic acid having from about six to about thirty carbon atoms. Any of such monocarboxylic acids mentioned above can be used. The acid can be the same acid as in the alkali metal salt, or different. Mixed acids and mixed polyvalent metals can be used.

Any polyvalent metal can be employed. The best results are obtained using barium, calcium, manganese, zinc cadmium, tin, copper, iron, cobalt or nickel, and of these barium, zinc, cadmium and tin are preferred. In nontoxic applications, the zinc, magnesium and calcium salts are preferred.

By selecting nontoxic polyvalent metals such as, for example, zinc salts and calcium salts, and nontoxic alkali metal salts, alone or in combination, nontoxic polyvinyl chloride resin compositions suitable for use for food packaging can be obtained.

In view of the antifogging properties of compositions incorporating a polyglycerol partial ester in accordance with the invention, such nontoxic compositions are especially advantageous. Other combinations of nontoxic polyvalent metal salts that can be used are those disclosed and claimed in U.S. Pats. Nos. 3,003,999, issued Oct. 10, 1961 to Kauder et al.; 3,003,998, issued Oct. 10, 1961 to Kauder et al.; and 3,004,000, issued Oct. 10, 1961 to Kauder et al.

Additional polyvinyl chloride resin stabilizers that can be employed are the organic phosphites. These contain aryl, alkyl, arylalkyl, alkaryl, cycloaliphatic, and heterocylic groups having from one to twenty carbon atoms and from one to three heterocyclic atoms other than nitrogen. These phosphites can be acid, that is, have one or two hydrogens attached through oxygen to the phosphorous, or neutral, that is, have the valences of the phosphorous atom taken up with the said groups, which can be monovalent, bivalent or trivalent, as desired, viz,

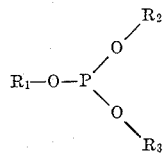

where $R_1$, $R_2$ and $R_3$ are hydrogen or organic groups, and at least one R is an organic group.

These R groups may be present in any combination. When bivalent or trivalent, they can form heterocyclic rings of the type

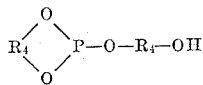

and can also form dimeric phosphites of the type

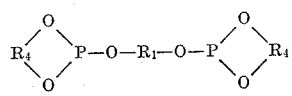

$R_4$ represents a bivalent group derived from a glycol or bisphenol or hydrogenated bisphenol. Exemplary are triphenyl phosphite, diphenyl phosphite, monophenyl phosphite, tricresyl phosphite, tri(dimethylphenyl)phosphite, tri-n-butyl phosphite, tri-2-ethyl hexyl phosphite, triisooctyl phosphite, diisooctyl phosphite, monoisooctyl phosphite, tridodecyl phosphite, diisooctyl monophenyl phosphite, mono-2-ethyl hexyl diphenyl phosphite, neopentyl glycol phenyl phosphite, propylene, glycol isooctyl phosphite, isooctyl diphenyl phosphite, tri(p-t-octylphenyl)phosphite, tri(p-t-nonylphenyl)phospite, tri(p-t-nonyl-o-cresyl)phosphite, diethylene glycol bis-butylene glycol bis-phosphite, tribenzyl phosphite, isobutyl dicresyl phosphite, isooctyl di(p-t-octylphenyl)phosphite, tri(2-ethylhexyl)phosphite, tri(2-cyclohexylphenyl)phosphite, tri-alpha-naphthyl phosphite, trifuryl phosphite, tritetrahydrofurfuryl phosphite, tricyclohexyl phosphite, and tricyclopentyl phosphite.

There also can be employed in conjunction with the stabilizing combination a polyvalent metal salt of a hydrocarbon-substituted phenol. The hydrocarbon substituent can contain from four to twenty-four carbon atoms. The metal can be an alkaline earth metal or other polyvalent metal, such as cadmium, calcium, barium, bismuth, antimony, lead, zinc and tin. Among such polyvalent metal phenolates there can be mentioned the magnesium, barium, calcium, strontium, cadium, lead, tin and zinc salts of n-butyl phenol, isoamyl phenol, isooctyl phenyl, 2-ethylhexyl phenol, t-nonylphenol, n-decyl phenol, t-dodecyl phenol, t-octyl phenol, isohexyl phenol, octadecyl phenol, diisobutyl phenol, methyl propyl phenol, diamyl phenol, methyl isohexyl phenol, methyl t-octyl phenol, di-t-nonyl phenol, di-t-dodecyl phenol, and ortho or paraphenyl phenol. The metal phenolate should be compatible with the resin and any plasticizers employed.

Also useful as supplementary stabilizers are the organic phenolic antioxidants including the alkyl substituted phenols having from six to thirty carbon atoms of which up to twenty-four carbon atoms can be in the alkyl group. The penol may contain one or more phenolic nuclei and one, two or more phenolic groups may be present. In addition, the phenolic nucleus may contain an amino group. The alkyl phenols may have from one to five alkyl radicals, preferably in the ortho or para positions to the phenolic group. The hindered phenols having alkyl or other blocking substituents in each position ortho to each hydroxyl group are preferred.

Exemplary of phenols in this class are phenol, resorcinol, catechol, eugenol, pyrogallol, cresol, alpha-naphthol, beta-naphthol, p-octyl phenol, p-dodecyl phenol, p-octadecyl phenol, p-isooctyl-m-cresol, p-isohexyl-o-cresol, 2,6-ditertiary butyl phenol, 2,6-diisopropylphenol, 2,6-ditertiary butyl-p-cresol, methylenebis-2,6-ditertiary butyl phenol, 2,2-bis(4-hydroxy-phenyl)propane, methylenebis-p-cresol, 4,4'-thiobisphenol, 4,4-methylene-bis-(2-tertiary butyl-6-methyl phenol), cyclohexylidene-bis-(2-tertiary butyl phenol), 4,4'-thiobis(3-methyl-6-tertiary butyl phenol), 2,2-thiobis(4-methyl-6-tertiary butyl phenol), 2,6-diisooctyl resorcinol, 4-octyl pyrogallol, and 3,5-ditertiary butyl catechol. Among the aminophenols which can be used are 2-isooctyl-p-aminophenol, N-steroyl-p-aminophenol, 2,6-diisobutyl-p-aminophenol, and N-ethyl-hexyl-p-aminophenol.

In general, adequate antifogging properties are imparted to polyvinyl chloride resins containing from about 0.1 to about 10 parts of the polyglycerol partial ester per 100 parts of polyvinyl chloride resin. A preferred proportion is within the range from about 0.5 to about 5 parts by weight. In combination therewith, there can be employed from about 0.025 to about 10 parts by weight of a heat stabilizer or of a heat stabilizer combination per 100 parts of resin. A preferred proportion is within the range from about 0.5 to about 5 parts by weight.

There can also be employed light stabilizers of the conventional type employed with polyvinyl chloride resins.

Excellent light stabilizers are compounds having the 2-hydroxy-benzophenone nucleus, acyloxybenzophenone, and optionally, inert substituents on either or both benzene rings of the benzophenone, such as alkyl, acyl, alkoxy, and hydroxyl groups. Exemplary are 2,2'-dihydroxy-benzophenone, 2-hydroxy-benzophenone, and linoleyl-2,2'-dihydroxy benzophenone.

Other useful light stabilizers include the o-hydroxy benzotriazoles, hydroxyaryl - 1,3,5 - triazines, dialkylhydroxybenzoic acid derivatives, the phenylsalicylates, and the hydroxybenzyloxybenzophenones, such as are disclosed in Canadian Pat. No. 752,902. Also see U.S. Pat. No. 3,261,791.

The invention is applicable to any polyvinyl chloride resin. The term "polyvinyl chloride" as used here is inclusive of any polymer formed at least in part of the recurring group

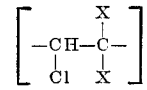

and having a chlorine content in excess of 40%. The X groups can each be either hydrogen or chlorine. In polyvinyl chloride homopolymers, each of the X groups is hydrogen. Thus, the term includes not only polyvinyl chloride homopolymers but also after-chlorinated polyvinyl chlorides, such as those disclosed in British Pat.

No. 893,288, and also copolymers of vinyl chloride in a major proportion and other copolymerizable monomers in a minor proportion, such as copolymers of vinyl chloride and vinyl acetate, copolymers of vinyl chloride with maleic or fumaric acids or esters, and copolymers of vinyl chloride with styrene. The invention also is applicable to mixtures of polyvinyl chloride in a major proportion with a minor proportion of other synthetic resins, such as chlorinated polyethylene or a copolymer of acrylonitrile, butadiene and styrene.

The antifogging combinations of this invention, both with and without supplementary stabilizers, are excellent stabilizers for both plasticized and unplasticized polyvinyl chloride resins. Compositions containing less than 10% plasticizer are referred to as rigid resins, and compositions containing from 10 to 15% plasticizer are semi-rigid resins. A plasticizer in an amount within the range from 15 to 100 parts by weight of the resin will give what is generally known as a plasticized polyvinyl chloride. When plasticizers are to be employed, they can be incorporated into the polyvinyl chloride resins by conventional techniques. The conventional plasticizers can be used, such as dioctyl phthalate, dioctyl sebacate, dioctyl adipate, and tricresyl phosphate.

Particularly useful plasticizers are the epoxy higher esters having from about 20 to about 150 carbon atoms. Such esters will initially have had unsaturation in the alcohol or acid portion of the molecule, which is taken up in the formation of the epoxy group.

Typical unsaturated acids are oleic, linoleic, linolenic, erucic, ricinoleic and brassidic acids, and these may be esterified with organic monohydric or polyhydric alcohols, the total number of carbon atoms of the acid and the alcohol being within the range stated. Typical monohydric alcohols include butyl alcohol, 2-ethylhexyl alcohol, lauryl alcohol, isooctyl alcohol, stearyl alcohol, and oleyl alcohol. The octyl alcohols are preferred. Typical polyhydric alcohols include pentaerythritol, glycerol, ethylene glycol, 1,2-propylene glycol, 1,4-butylene glycol, neopentyl glycol, ricinoleyl alcohol, erythritol, mannitol and sorbitol. Glycerol is preferred. These alcohols may be fully or partially esterified with the epoxidized acid. Also useful are the epoxidized mixtures of higher fatty acid esters found in naturally-occurring oils such as epoxidized soybean oil, epoxidized olive oil, epoxidized cottonseed oil, epoxidized tall oil fatty acid esters, epoxidized coconut oil and epoxidized tallow. Of these, epoxidized soybean oil is preferred.

The alcohol can contain the epoxy group and have a long or short chain, and the acid can have a short or long chain, such as epoxy stearyl acetate, epoxy stearyl stearate, glycidyl stearate, and polymerized glycidyl methacrylate.

A small amount, usually not more than 0.1% by weight of the composition, of a parting agent also can be included. Typical parting agents are the higher aliphatic acids, including the halogenated acids, having from twelve to twenty-four carbon atoms, such as stearic acid, pentachlorostearic acid, lauric acid, palmitic acid and myristic acid, mineral lubricating oils, polyvinyl stearate, polyethylene and paraffin wax.

The preparation of the stabilized polyvinyl chloride resin composition is easily accomplished by conventional procedures. The selected stabilizer combination is mixed with the plasticizer, if any, and then is blended with the polyvinyl chloride resin using, for example, plastic mixing rolls, at a temperature at which the mix is fluid and thorough blending facilitated, milling the plasticizer, if any, and stabilizers with the resin on a two-roll mill at from 250° to 450° F. for a time sufficient to form a homogeneous sheet. Usually, 5 minutes milling time is adequate. After the mass is uniform, it is sheeted out in the usual fashion.

The polyglycerol partial esters used in the following examples are all defined by saponification and hydroxyl (OH) number in addition to the "average" number of glyceryl units and number of free hydroxyl groups. These numbers are given as average, because most such polyglycerol partial esters are complex mixtures of species of varying molecular weight and of different degrees of esterification. Accordingly, a partial ester that is defined as on the average ⅓ esterified, will contain species that are half esterified and 60% esterified. Similarly, esters that are defined as being 50% esterified, will contain species that are 75% esterified and 25% esterified, and even a small proportion of species that are fully esterified or not esterified at all.

The following examples in the opinion of the inventor constitute preferred embodiments of his invention.

EXAMPLE 1

A series of antifogging plasticized polyvinyl chloride resin compositions was prepared having the following formulation.

| Composition: | Parts by weight |
|---|---|
| Polyvinyl chloride homopolymer (Diamond 450) | 100 |
| Plasticizers— | |
| Dioctylphthalate | 35 |
| Epoxidized soybean oil | 15 |
| Antifogging agent (as shown in Table I) | 1.5 |

The above mixture was milled on a two-roll mill at 350° F. for 3 minutes and then sheeted off. Pressed polished sheets were formed 3 mils and 20 mils thick. The antifogging properties of each formulation were tested by the following procedures.

Test 1.—Samples of the 20 mil sheets were brought close to the mouth and a breath of air exhaled onto each sheet. The sheet was then immediately observed to determine whether any fog or moisture condensation appeared on the sheet.

Test 2.—50 ml. samples of water at 25° C. were placed in 4-ounce wide-mouthed jars. A sample of the 3 mil sheets was stretched over the mouth of each jar and fastened with a rubber band. The jars were then placed in a refrigerator at 40° F. The film samples were observed to determine the time at which moisture began to condense and a film of fog formed on each sheet. The results of Tests 1 and 2 are set forth in Table I below.

TABLE I

| Example | Antifogging Agent | Test 1 | Test 2 (time to fogging) |
|---|---|---|---|
| Control A | None | Fogging | Less than ½ min. |
| Control B | Glycerylmonooleate (Emcol GMOP). | do | Less than ½ min. |
| Example 1 | Polyglyceryl oleate [1] | No fogging | No fogging after 1 hour. |

[1] Having an average of three glyceryl units per molecule. Saponification number was 140, OH number was 300.

As shown, both Control A, which contained no antifogging agent, and Control B, which contained glycerylmonooleate, a prior art antifogging agent for olefin polymer resins, showed moisture condensate and resultant fogging during Test 1 and began to fog within less than ½ minute in Test 2. Example 1, containing a polyglyceryl oleate, an antifogging agent according to this invention, showed no fogging during Test 1 and no fogging after even one hour under the conditions of Test 2.

EXAMPLE 2

A series of plasticized polyvinyl chloride resin compositions was prepared for use as food wrap material for meat wrapping. The composition contained various emulsifiers as antifogging agents. The resin compositions have the following formulation.

| Composition: | Parts by weight |
|---|---|
| Polyvinyl chloride homopolymer (Diamond 450) | 100 |
| Plasticizers— | |
| Dioctyl adipate | 35 |
| Epoxidized soybean oil | 16.55 |
| Stabilizers— | |
| Calcium stearate | 0.15 |
| Zinc stearate | 0.20 |
| 2,6-ditert-butyl-p-cresol | 0.10 |
| Antifogging agent (as shown in Table II) | 1.5 |

The stabilizer components and antifogging agent were mixed and then blended with the polyvinyl chloride and the two plasticizers. The mixture was milled and sheeted off as in Example 1 above. Pressed polished sheets of 3 mil and 20 mil thickness were prepared and tested as described in Example 1. The results of Tests 1 and 2 are recorded in Table II below.

TABLE II

| Example | Antifogging Agent | Test 1 | Test 2 (time to fogging) |
|---|---|---|---|
| Control C | Polyoxyethylene sorbitan oleate (Tween 80). | Fogging | Less than ½ min. |
| Control D | Glycerylmonooleate (Emcol GMOP). | do | Less than ½ min. |
| Example 2 | Polyglyceryloleate [1] | No fogging | None after 1 hour. |

[1] Having an average of ten glyceryl units per molecule. Saponification number was 135, OH number was 230.

A comparison of Example 2 with Controls C and D show the far superior antifogging activity in polyvinyl chloride resins of the polyglycerol partial esters of the present invention in the presence of the usual heat stabilizers used for food wrapping materials.

EXAMPLE 3

Polyvinyl chloride resin compositions having the following formulations were prepared.

| Composition: | Parts by weight |
|---|---|
| Polyvinyl chloride homopolymer (Diamond 450) | 100 |
| Dioctylphthalate | 50 |
| Stabilizers— | |
| Zinc stearate | 0.5 |
| 2,6-ditert-butyl-p-cresol | 0.1 |
| Antifogging agent | 1.5 |

The stabilizer formulations were mixed and blended with the polyvinyl chloride resin and plasticizer which was then sheeted off and pressed into 3 mil and 20 mil sheets and subjected to the fogging Tests 1 and 2 described in Examples 1 and 2 above. Strips were also cut into one-inch squares and tested in an air oven at 350° F. for heat stability. The results of these tests are set forth in Table III.

TABLE III

| Antifogging composition | Control E, glycerylmonooleate | Example 3, polyglycerol oleate [1] |
|---|---|---|
| Fogging test 1 | Fogging | No fogging. |
| Fogging test 2 (time to fogging) | Less than ½ min | None after 1 hour. |

Heat stability at 350° F.

| Minutes: | Control E, color | Example 3, color |
|---|---|---|
| 0 | Clear, colorless | Clear, colorless. |
| 5 | Black | Do. |
| 10 | do | Do. |
| 15 | do | Do. |
| 20 | do | Black spots. |
| 25 | do | Black. |

[1] Having an average of four glyceryl units per molecule. Saponification number was 141, OH number was 275.

A comparison of Example 3 with Control E confirms the results of Examples 1 and 2 that the pollyglyceryl oleate of this invention shows far superior antifogging properties than glycerylmonooleate. In the heat stability test at 350° F., the resin of Control E turned black indicating a failure after only five minutes of heating while the resin of Example 3 maintained a clear colorless appearance for 15 minutes. Accordingly, not only are the polyglycerol partial esters of the present invention superior antifogging agents, but they are also superior in regard to the heat stability of the resin as well.

EXAMPLE 4

A series of polyvinyl chloride resin compositions was prepared having the following formulations.

| Composition: | Parts by weight |
|---|---|
| Polyvinyl chloride homopolymer (Diamond 450) | 100 |
| Plasticizers— | |
| Dioctyl phthalate | 35 |
| Epoxidized soybean oil | 15 |
| Stabilizers— | |
| Zinc stearate | 0.5 |
| 2,6-di-tert-butyl-p-cresol | 0.1 |
| Antifogging agent (as shown in Table IV) | 1.5 |

The compositions were mixed, milled and tested as in Example 3 above; the results are set forth in Table IV below.

TABLE IV

| Antifogging composition | Control F, glycerylmonooleate (Emcol GMOP) | Example 4, Polyglyceryl oleate [1] |
|---|---|---|
| Test 1 | Fogging | No fogging. |
| Test 2 (time to fogging) | Less than ½ min | None after 1 hour. |

Heat stability 375° F.

| Minutes: | Color | Color |
|---|---|---|
| 0 | Clear, colorless | Clear, colorless. |
| 15 | Pale yellow | Pale yellow. |
| 30 | Light yellow | Light yellow. |
| 45 | Black | Yellow. |
| 60 | do | Yellow and black. |
| 75 | do | Black. |

[1] Having an average of four glyceryl units per molecule. Saponification number was 141 OH number was 275.

A comparison of Control F and Example 4 shows that at 375° F. the improvement in heat stability of the resin containing the polyglyceryl oleate of the present invention is also evident. Control F turned black after 45 minutes while the material of Example 4 containing a composition according to the present invention was still only a yellow color after 45 minutes and had a yellow and black color after 60 minutes. The antifogging superiority of the polyglyceryl oleate is shown by the results of Tests 1 and 2.

EXAMPLE 5

A series of polyvinyl chloride resin compositions was prepared having the following base formulation.

| Composition: | Parts by weight |
|---|---|
| Polyvinyl chloride homopolymer (med. mol. wt.) | 100 |
| Plasticizers— | |
| Dioctyl adipate | 20 |
| Epoxidized soybean oil | 15 |
| Tris nonylphenyl phosphite | 1.0 |
| Heat stabilizer and antifogging composition (as shown in Table V) | 1.5 |

The stabilizer and antifogging composition employed in Control G and in Example 5 have the following formulation:

|  | Commercial stabilizer Control G | Antifogging stabilizer Examples |
|---|---|---|
| Epoxidized soybean oil | 1.160 | 0.175 |
| Zinc stearate | 0.150 | 0.250 |
| 2,6-di-t-butyl-p-cresol | 0.075 | 0.075 |
| Calcium stearate | 0.115 |  |
| Polyglyceryl oleate[1] |  | 1.000 |
| Total | 1.5 | 1.5 |

[1] Having an average of four glyceryl units per molecule. Saponification number is 141 OH number is 275.

The compositions were mixed, milled, pressed and tested as in Example 4 above. The results are set out in Table V.

TABLE V

|  | Control G | Example 5 |
|---|---|---|
| Test 1 | Fogging | No fogging. |
| Test 2 (time to fogging) | Immediately | None after 1 hour. |

Heat stability at 375°F.

| Time, minutes: | Control Formulation G | Example 5 |
|---|---|---|
| 0 | Clear and colorless | Clear and colorless. |
| 15 | Light yellow | Very light yellow. |
| 30 | Yellow | Light yellow. |
| 45 | Dark yellow | Do. |
| 60 | do | Yellow. |
| 75 | do | Do. |
| 90 | do | Dark yellow. |
| 105 | do | Do. |
| 120 | do | Dark yellow with charred edges. |

A comparison of Control G with Example 5 shows that the composition prepared according to this invention not only has superior antifogging properties to the material of the prior art, but also has the superior heat stability even when it contains only a single metal salt as compared to a double metal salt contained in the commercial stabilizer. This is surprising in view of the well-accepted fact that a combination of a zinc salt with a second salt, such as calcium stearate, will result in a synergistic improvement in stabilizing activity. A greater improvement was obtained with the polyglyceryl oleate according to the present invention.

EXAMPLE 6

An antifogging polyvinyl chloride resin composition was prepared having the following formulation.

| Composition: | Parts by weight |
|---|---|
| Polyvinyl chloride homopolymer | 100 |
| Plasticizers— |  |
| Dioctyl phthalate | 35 |
| Epoxidized soybean oil | 15 |
| Stabilizers— |  |
| Zinc oleate-stearate | 0.25 |
| 2,6-di-t-butyl-p-cresol | 0.1 |
| Glycerolysis product of polyglycerol and cottonseed oil (Saponification number is 132 OH number is 255) | 1.5 |

The above composition was mixed, milled and pressed and tested as in Example 1 following both Tests 1 and 2. No fogging occurred in either test. Accordingly, the polyglycerol partial ester derived from unsaturated oils are also effective as antifogging agents for polyvinyl chloride resin compositions.

EXAMPLE 7

A series of polyvinyl chloride resin compositions was prepared having the following formulation.

| Composition: | Parts by weight |
|---|---|
| Polyvinyl chloride homopolymer (Diamond 450) | 100 |
| Plasticizers— |  |
| Dioctyl phthalate | 20 |
| Epoxidized soybean oil | 15 |
| Stabilizers— |  |
| Calcium stearate | 1.0 |
| Zinc stearate | 0.25 |
| 2,6-di-t-butyl-p-cresol | 0.075 |
| Antifogging agent (as shown in Table VII) (polyglyceryl oleate—PGO—same as Example 3) (polyglyceryl monostearate—PGS) | 1.5 |

The above compositions were mixed, milled and pressed as in Example 2 and subjected to Test 1. The results are set forth in Table VII below.

TABLE VII

|  | Antifogging agent | Percent oleate | Test 1 |
|---|---|---|---|
| A | None | 0 | Fogging. |
| B | PGO | 100 | No fogging. |
| C | PGS | 0 | Fogging. |
| D | PGO, 0.75; PGS, 0.75 | 50 | Do. |
| E | PGO, 1.0; PGS, 0.5 | 67 | No fogging. |
| F | PGO, 0.5; PGS, 1.0 | 33 | Fogging. |
| G | PGO, 0.25; PGS, 1.25 | 16.7 | Do. |
| H | PGO, 1.25; PGS, 0.25 | 83.3 | No fogging. |

A comparison of the above results confirm that up to about 40% of the saturated fatty acid partial ester of polyglycerol can be mixed with the unsaturated fatty acid partial ester without forfeiting the desirable antifogging properties of the present invention.

Having regard to the foregoing disclosure, the following is claimed as the inventive and patentable embodiments thereof:

1. A polyvinyl chloride resin stabilizer composition capable of improving the resistance of the resin to fogging and to heat deterioration comprising a partial ester of a polyglycerol with an unsaturated aliphatic monocarboxylic acid having from about eight to about twenty-four carbon atoms, not more than 75% of the hydroxyl groups of the polyglycerol being esterified, and a zinc salt of a monocarboxylic fatty acid having from about six to about thirty carbon atoms in a ratio of polyglycerol partial ester: zinc salt within the range from 0.1:10 to 10:0.025, the zinc salt and the polyglycerol partial ester together displaying an enhanced stabilizing effectiveness.

2. A polyvinyl chloride resin stabilizer composition in accordance with claim 1, in which not more than one-half of the hydroxyl groups of the partial ester are esterified.

3. A polyvinyl chloride resin stabilizer composition in accordance with claim 1 comprising an organic phosphite.

4. A polyvinyl chloride resin stabilizer composition in accordance with claim 1 comprising a phenolic antioxidant.

5. A polyvinyl chloride resin stabilizer composition in accordance with claim 1, comprising an epoxy compound having from ten to about sixty carbon atoms.

6. A polyvinyl chloride resin stabilizer composition in accordance with claim 5, in which the antifogging agent is a polyglyceryl oleate having from two to about twelve glyceryl units and from about two to about twelve free hydroxyl groups per molecule.

7. A polyvinyl chloride resin stabilizer composition in accordance with claim 5, in which not more than one-half of the hydroxyl groups of the partial ester are esterified.

8. A polyvinyl chloride resin stabilizer composition in accordance with claim 5, in which the epoxy compound is a polyvinyl chloride resin epoxy plasticizer.

9. A polyvinyl chloride resin stabilizer composition in accordance with claim 5, in which the epoxy compound is epoxidized soyabean oil.

10. A polyvinyl chloride resin composition having increased resistance to fogging and to heat deterioration, comprising a polyvinyl chloride resin having a tendency to fog and an amount to enhance the resistance of the resin to fogging of a stabilizer composition according to claim 1.

11. A polyvinyl chloride resin composition in accordance with claim 10 in which not more than one-half of the hydroxyl groups of the partial ester are esterified.

12. A polyvinyl chloride resin composition in accordance with claim 10, including a proportion of a polyglycerol partial ester of a saturated aliphatic monocarboxylic acid having from about eight to about twenty-four carbon atoms in an amount of up to about 60 mol percent of the polyglycerol partial ester of an unsaturated aliphatic monocarboxylic acid.

13. A polyvinyl chloride resin composition in accordance with claim 10 containing a polyglycerol partial ester of oleic acid.

14. A polyvinyl chloride resin stabilizer composition in accordance with claim 10, comprising an epoxy compound having from ten to about sixty carbon atoms.

15. A polyvinyl chloride resin composition having increased resistance to fogging and to heat deterioration comprising a polyvinyl chloride resin and a stabilizer combination in accordance with claim 3.

16. A polyvinyl chloride resin composition having increased resistance to fogging and to heat deterioration comprising a polyvinyl chloride resin and a stabilizer combination in accordance with claim 4.

References Cited
UNITED STATES PATENTS

| | | | |
|---|---|---|---|
| 3,225,001 | 12/1965 | Darsa | 260—23X |
| 3,326,831 | 6/1967 | Avtges | 260—28.5 |
| 3,347,823 | 10/1967 | Buckley et al. | 260—23X |

OTHER REFERENCES

PVC Technology, by Penn, page 147 (1962).

DONALD E. CZAJA, Primary Examiner

D. J. BARRACK, Assistant Examiner

U.S. Cl. X.R.

252—400; 260—23.7, 30.4, 30.6, 31.8, 45.7, 45.75, 45.8, 45.85, 45.9, 45.95, 92.8, 890, 899